United States Patent Office
3,086,015
Patented Apr. 16, 1963

3,086,015
2-DIFLUOROMETHYL-$\Delta^1$ AND $\Delta^{1,4}$-3-KETO STEROIDS OF THE PREGNANE SERIES AND PROCESS THEREFOR
James C. Orr, Albert Bowers, and John Edwards, all of Mexico City, Mexico, assignors to Syntex S.A., Mexico City, Mexico, a corporation of Mexico
No Drawing. Filed Apr. 13, 1962, Ser. No. 187,200
24 Claims. (Cl. 260—239.55)

The present invention relates to certain new cyclopentanophenanthrene derivatives and to the method for making the same.

More particularly the present invention relates to a new method for making 2-difluoromethyl-$\Delta^1$ and $\Delta^{1,4}$-3-keto-steroids of the androstane and pregnane series.

In our copending application Serial No. 107,039, filed on May 2, 1961, there is described the 2-difluoromethyl-$\Delta^1$- and $\Delta^{1,4}$-androstane compounds.

The novel compounds obtained by the method object of the present invention are represented by the following formulas:

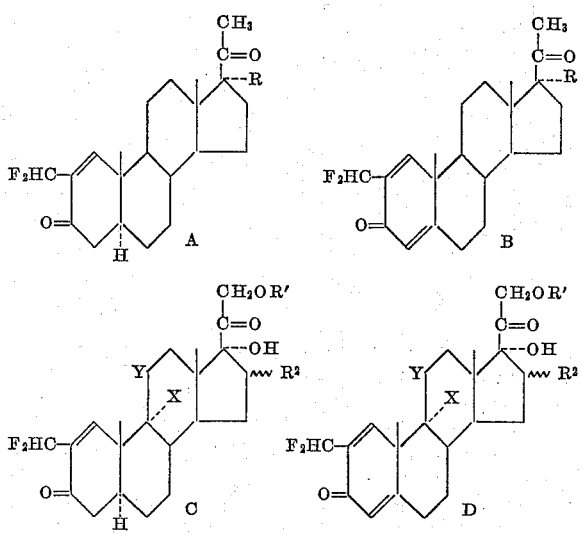

In the above formulas, R represents hydrogen or a free or esterified hydroxy group; $R^1$ represents hydrogen or an acyl group of less than 12 carbon atoms; $R^2$ represents hydrogen, $\alpha$ or $\beta$ methyl, $\alpha$-hydroxy, $\alpha$-acyloxy.

When $R^2$ is an $\alpha$-hydroxy group, $R^2$ may represent jointly with the hydroxy group at C–17 the radical

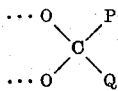

wherein P represents lower alkyl and Q represents a lower alkyl, an aryl or aralkyl group, each containing up to 8 carbon atoms. Y represents hydrogen, $\beta$-hydroxy or keto and X represents hydrogen, chlorine or fluorine.

The compounds of Formulas A and B are progestational agents, the 17-esters show high activty on oral administration. The compounds of Formulas C and D are potent cortical hormones exhibiting glycogenic, thymolytic, anti-inflammatory, anti-estrogenic and antiandrogenic properties and inhibit the pituitary.

In accordance with the present invention, when a 2-formyl-$\Delta^1$ or 2-formyl-$\Delta^{1,4}$-3-keto steroid is reacted with a mixture of sulfur tetrafluoride and hydrogen fluoride in an inert organic solvent, there are produced the 2-difluoromethyl-$\Delta^1$ or 2-difluoromethyl-$\Delta^{1,4}$-3-keto derivatives, as illustrated by the following reaction, wherein only rings A and B of the steroid molecule are represented:

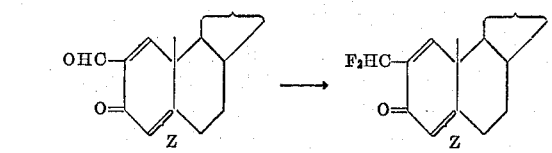

In the above equation, Z represents a single or double bond between C–4 and C–5.

In practicing the process outlined above, a 2-formyl-$\Delta^1$ or 2-formyl-$\Delta^{1,4}$-3-keto steroid of the androstane and pregnane series is dissolved in a suitable organic solvent, preferably using a chlorinated hydrocarbon such as methylene dichloride, chloroform, carbon tetrachloride or the like, and the solution treated with a small amount of a reagent previously prepared from sulfur tetrafluoride and hydrogen fluoride, 1:0.2 molar ratio. The reaction mixture is allowed to stand at room temperature, in a sealed steel tube for a period of time in the order of 20 to 48 hours, and then carefully poured into dilute aqueous bicarbonate solution, the organic layer is separated and the aqueous layer extracted with the same solvent, the combined organic extract is washed, dried and evaporated. The difluoromethyl compounds are generally purified by chromatography on neutral alumina.

In the case of compounds possessing the dihydroxyacetone cortical side chain, this must be protected as by formation of the bismethylenedioxy derivative. The quantity of hydrogen fluoride in the reagent mixture should be reduced to 0.05 molar equivalent. The bismethylenedioxy grouping is subsequently removed by the standard methods, that is, by reaction with 60% formic acid or 80% acetic acid at the steam bath temperature.

Alternatively, the hydrogen fluoride can be generated in situ, from sulfur tetrafluoride and ethanol.

The starting materials used for the process of the present invention, i.e. the 2-formyl-$\Delta^1$ and 2-formyl-$\Delta^{1,4}$-3-keto-steroids are obtained by treatment of the 2-hydroxymethylene-3-keto steroids (with or without a double bond at C–4, 5) with 2,3-dichloro-5,6-dicyano-1,4-benzoquinone, in accordance with the method described in our copending application, Serial No. 156,958, filed December 4, 1961.

Our method is applicable in general to any 2-formyl-$\Delta^1$ and $\Delta^{1,4}$-3-keto steroids containing from eighteen to twenty-one carbon atoms. A variety of substituents may be present on the steroid nuclei without affecting the reaction in any way. This includes substituents as for instance at the C–6, 9, 11, 14, 15, 16 and 17 positions. A keto group may occur at C–11, 17 and/or 20 positions; free or esterified hydroxy groups may be present at C–11, 16, 17 and/or 21-positions. As indicated before, the dihydroxy acetone side chain, when present, must be protected by formation of the bismethylenedioxy derivative or a 21-ester.

Methyl groups may be present at C–6, 16 and/or 17. In the androstane series an alkyl, alkenyl or alkynyl group may be present at the 17$\alpha$-position.

A halogen atom may also be present at C–9 and/or 21, (particularly fluorine). In the compounds substituted at C–16 and 17 by hydroxyl groups, these substituents may be together in the form of a cyclic ketal or acetal moiety.

The following examples serve to illustrate but are not intended to limit the scope of the present invention:

PREPARATION I

A mixture of 2 g. of 2,3-dichloro-5,6-dicyano-1,4-benzoquinone in 40 cc. of dioxane was added to a solution of 2 g. of 2-hydroxy-methylene dihydrotestosterone, in 30 cc. of dioxane at room temperature. After 2 minutes at room temperature the reaction mixture was diluted with 50 cc. of methylene chloride and then filtered to remove the precipitate of dichloro-dicyano-hydroquinone. The filtrate was adsorbed onto 80 g. of alumina. Elution and crystallization of the solid portions from acetone-hexane afforded 2-formyl-Δ¹-androsten-17β-ol-3-one.

Following the above technique there were treated 2-hydroxymethylene-17α-methyl-dihydroallotestosterone,
2-hydroxymethylene-17α-vinyl-dihydroallotestosterone,
2-hydroxymethylene-17α-ethinyl-dihydroallotestosterone,
2-hydroxymethylene-19-nor-dihydroallotestosterone,
2-hydroxymethylene-9-nor-17α-methyl-dihydroallotestosterone,
2-hydroxymethylene-testosterone, 2-hydroxymethylene-17α-methyl-testosterone,
2-hydroxymethylene-17α-vinyl-testosterone, 2-hydroxymethylene-17α-ethinyl-testosterone, to produce respectively:

2-formyl-17α-methyl-Δ¹-androsten-17β-ol-3-one,
2-formyl-17α-vinyl-Δ¹-androsten-17β-ol-3-one,
2-formyl-17α-ethinyl-Δ¹-androsten-17β-ol-3-one,
2-formyl-19-nor-Δ¹-androsten-17β-ol-3-one,
2-formyl-17α-methyl-19-nor-Δ¹-androsten-17β-ol-3-one,
2-formyl-Δ¹,⁴-androstadien-17β-ol-3-one,
2-formyl-17α-methyl-Δ¹,⁴-androstadien-17β-ol-3-one,
2-formyl-17α-vinyl-Δ¹,⁴-androstadien-17β-ol-3-one, and
2-formyl-17α-ethinyl-Δ¹,⁴-androstadien-17β-ol-3-one.

PREPARATION II

By following the method described in the preceding preparation, 5 g. of the 20-ethylene-ketal of 2-hydroxymethylene-progesterone, described in U.S.P. 2,947,762 was converted into 2-formyl-20-ethylenedioxy-Δ¹,⁴-pregnadien-3-one.

3 g. of the foregoing compound were dissolved in 120 cc. of acetone and treated with 300 mg. of p-toluenesulfonic acid, the reaction mixture was kept at room temperature overnight. It was then poured into ice water, extracted with ethyl acetate and the organic extract washed with water to neutral, dried and evaporated to dryness. Addition of ether gave 2-formyl-Δ¹,⁴-pregnadiene-3,20-dione.

In a similar manner, starting from the 20-ethylene-ketal of 2-hydroxymethylene-17α-hydroxy-progesterone there were produced successively 2-formyl-20-ethylene-dioxy-Δ¹,⁴-pregnadien-17-ol-3-one and 2-formyl-Δ¹,⁴-pregnadien-17α-ol-3,20-dione.

PREPARATION III

To a solution of 5 g. of allopregnane-17α,21-diol-3,20-dione in 200 cc. of chloroform there was added 40 cc. of 37% aqueous formaldehyde and 5 cc. of concentrated hydrochloric acid and the mixture stirred for 48 hours at room temperature. The two layers were separated, the aqueous layer was washed with chloroform and the combined organic solutions washed to neutral, dried over anhydrous sodium sulfate and evaporated to dryness. Recrystallization of the residue from methanol-ether gave the pure 17,20;20,21 - bismethylenedioxy-allopregnan-3-one.

In a similar manner allopregnane-17α,21-diol-3,11,20-trione, 9α-fluoro-Δ⁴-pregnene-11β,16α,17α,21-tetrol-3,20-dione and Δ⁴-pregnene-16α,17α,21-triol-3,20-dione were converted into the corresponding bismethylenedioxy derivatives.

PREPARATION IV

To a solution of 16α-methyl-17,20;20,21-bismethylenedioxy-Δ⁴-pregnen-11β-ol-3-one, described for example in U.S.P. 2,888,457, in 60 cc. of anhydrous benzene, there was added 3 cc. of ethyl formate and 1.3 g. of sodium hydride, suspended in mineral oil while cooling and stirring under an atmosphere of nitrogen. The mixture was stirred for 24 hours at room temperature, hexane was added until complete precipitation, the solid was collected and dried under vacuum. The crude material was suspended in dilute aqueous hydrochloric acid and stirred at room temperature for half an hour. The precipitate was collected, washed with water and dried. Recrystallization from methylene chloride-hexane gave 2-hydroxymethylene - 16α-methyl-17,20;20,21-bismethylenedioxyΔ⁴-pregnen-11β-ol-3-one.

Upon treatment of the latter compound with 2,3-dichloro-5,6-dicyano-1,4-benzoquinone in dioxane, in accordance with the method described in Preparation I, there was produced 16α - methyl - 17,20;20,21-bismethylene-dioxy-2-formyl-Δ¹,⁴-pregnadien-11β-ol-3-one.

PREPARATION V

When applying the above described procedure to the starting compounds listed below, there were produced the products hereinafter set forth (via the corresponding 2-hydroxymethylene derivatives).

| Starting compounds | Final products |
| --- | --- |
| 17,20; 20,21-bismethylene-dioxy-Δ⁴-pregnene-3,11-dione. | 17,20; 20,21-bismethylene-dioxy-2-formyl-Δ¹,⁴-pregnadiene-3,11-dione. |
| 17,20; 20,21-bismethylene-dioxy-11β-ol-3-one. | 17,20; 20,21-bismethylene-dioxy-2-formyl-Δ¹,⁴-pregnadien-11β-ol-3-one. |
| 17,20; 20,21-bismethylene-dioxy-9α-fluoro-Δ⁴-pregnen-11β-ol-3-one. | 17,20; 20,21-bismethylene-dioxy-2-formyl-9α-fluoro-Δ¹,⁴-pregnadien-11β-ol-3-one. |
| 17,20; 20,21-bismethylene-dioxy-9α-chloro-Δ⁴-pregnen-11β-ol-3-one. | 17,20; 20,21-bismethylene-dioxy-2-formyl-9α-chloro-Δ¹,⁴-pregnadien-11β-ol-3-one. |
| 17,20; 20,21-bismethylene-dioxy-allopregnan-11β-ol-3-one. | 17,20; 20,21-bismethylene-dioxy-2-formyl-Δ¹-allopregnen-11β-ol-3-one. |
| 17,20; 20,21-bismethylene-dioxy-Δ⁴-pregnen-3-one. | 17,20; 20,21-bismethylene-dioxy-2-formyl-Δ¹,⁴-pregnadien-3-one. |
| 17,20; 20,21-bismethylene-dioxy-16α-methyl-Δ⁴-pregnene-3,11-dione. | 17,20; 20,21-bismethylene-dioxy-2-formyl-16α-methyl-Δ¹,⁴-pregnadiene-3,11-dione. |
| 17,20; 20,21-bismethylene-dioxy-16β-methyl-Δ⁴-pregnene-3,11-dione. | 17,20; 20,21-bismethylene-dioxy-2-formyl-16β-methyl-Δ¹,⁴-pregnadiene-3,11-dione. |
| 17,20; 20,21-bismethylene-dioxy-16α-methyl-Δ⁴-pregnen-3-one. | 17,20; 20,21-bismethylene-dioxy-2-formyl-16α-methyl-Δ¹,⁴-pregnadien-3-one. |
| 17,20; 20,21-bismethylene-dioxy-allopregnan-3-one. | 17,20; 20,21-bismethylene-dioxy-2-formyl-Δ¹-allopregnen-3-one. |
| 17,20; 20,21-bismethylene-dioxy-allopregnane-3,11-dione. | 17,20; 20,21-bismethylene-dioxy-2-formyl-Δ¹-allopregnene-3,11-dione. |
| 17,20; 20,21-bismethylene-dioxy-Δ⁴-pregnen-16α-ol-3-one. | 17,20; 20,21-bismethylene-dioxy-2-formyl-Δ¹,⁴-pregnadien-16α-ol-3-one. |
| 17,20; 20,21-bismethylene-dioxy-9α-fluoro-Δ⁴-pregnene-11β,16α-diol-3-one. | 17,20; 20,21-bismethylene-dioxy-2-formyl-9α-fluoro-Δ¹,⁴-pregnadien-11β,16α-diol-3-one. |

*Example I*

A solution of 1 g. of 2-formyl-17α-methyl-Δ¹-androsten-17β-ol-3-one in 30 cc. of methylene chloride was treated with 3 cc. of a reagent previously prepared from 54 g. of sulfur tetrafluoride and 2 g. of anhydrous hydrogen fluoride. The reaction mixture was kept in a sealed steel tube at room temperature for 40 hours, and then carefully poured into 5% aqueous sodium bicarbonate solution. The organic layer was separated and the aqueous layer extracted with methylene chloride. The combined organic extract was washed until neutral, dried over anhydrous sodium sulfate and evaporated to dryness. The residue was then chromatographed on 50 g. of neutral alumina, thus giving the pure 2-difluoromethyl-17α-methyl-Δ¹-androsten-17β-ol.

*Example II*

To a solution of 1 g. of 2-formyl-Δ¹,⁴-pregnadien-17α-ol-3,20-dione in 50 cc. of carbon tetrachloride there was added 5 cc. of the mixture of sulfur-tetrafluoride-hydrogen fluoride. The reaction mixture was kept in a sealed tube at room temperature for 24 hours; after following the isolation and purification techniques of the preceding example there was obtained 2-difluoro-methyl-Δ¹,⁴-pregnadien - 17α - ol-3,20-dione (2-difluoromethyl-Δ¹-dehydro-17α-hydroxy-progesterone).

A mixture of 500 mg. of the latter compound, 500 mg. of p-toluenesulfonic acid monohydrate, 25 cc. of acetic acid and 12.5 cc. of acetic anhydride was kept for 24 hours at room temperature. It was then poured into water and stirred until the excess of anhydride had hydrolyzed. Isolation of the product by methylene chloride extraction and crystallization of the residue from acetone-ether gave 2-difluoromethyl-$\Delta^1$-dehydro-17α-acetoxy-progesterone.

*Example III*

By following the method described in Example I the compounds listed below under I were converted into the corresponding 2 difluoromethyl derivatives II.

| I | II |
|---|---|
| 2-formyl-17α-vinyl-$\Delta^1$-androsten-17β-ol-3-one. | 2-difluoromethyl-17α-vinyl-$\Delta^1$-androsten-17β-ol-3-one. |
| 2-formyl-17α-methyl-19-nor-$\Delta^1$-androsten-17β-ol-3-one. | 2-difluoromethyl-17α-methyl-19-nor-$\Delta^1$-androsten-17β-ol-3-one. |
| 2-formyl-19-nor-$\Delta^1$-androsten-17β-ol-3-one. | 2-difluoromethyl-19-nor-$\Delta^1$-androsten-17β-ol-3-one. |
| 2-formyl-$\Delta^{1,4}$-androstadien-17β-ol-3-one. | 2-difluoromethyl-$\Delta^{1,4}$-androstadien-17β-ol-3-one. |
| 2-formyl-17α-ethinyl-$\Delta^{1,4}$-androstadien-17β-ol-3-one. | 2-difluoromethyl-17α-ethinyl-$\Delta^{1,4}$-androstadien-17β-ol-3-one. |
| 2-formyl-$\Delta^{1,4}$-pregnadien-3,20-dione. | 2-difluoromethyl-$\Delta^{1,4}$-pregnadien-3,20-dione. |

*Example IV*

A solution of 2 g. of 16α-methyl-17,20;20,21-bismethylene-dioxy-2-formyl-$\Delta^{1,4}$-pregnadien-11β-ol-3-one in 75 cc. of methylene chloride was treated with 6 cc. of a previously prepared mixture of 21.6 g. of sulfur-tetrafluoride and 0.2 g. of anhydrous hydrogen fluoride, and the reaction mixture left at room temperature for 40 hours in a sealed tube; it was then poured into sodium bicarbonate solution, the organic layer was separated, washed to neutral, dried and evaporated to dryness. After chromatography of the residue there was obtained 17,20;20,21-bismethylenedioxy - 2 - difluoromethyl-$\Delta^{1,4}$-pregnadien-11β-ol-3-one.

1 g. of the preceding bismethylenedioxy derivative was heated on the steam bath with 20 cc. of 60% formic acid acid for 1 hour, cooled, diluted with water and the precipitate was collected, washed with water, dried and recrystallized from acetone-hexane, thus affording 2-difluoromethyl-16α-methyl-prednisolone.

*Example V*

Following the method described in the preceding example, the compounds listed below under I were converted into the 2-difluoromethyl derivatives II.

| I | II |
|---|---|
| 17,20; 20,21-bismethylene-dioxy-2-formyl-$\Delta^{1,4}$-pregnadien-3,11-dione. | 2-difluoromethyl-prednisone. |
| 17,20; 20,21-bismethylene-dioxy-2-formyl-$\Delta^{1,4}$-pregnadien-11β-ol-3-one. | 2-difluoromethyl-prednisolone. |
| 17,20; 20,21-bismethylene-dioxy-2-formyl-9α-fluoro-$\Delta^{1,4}$-pregnadien-11β-ol-3-one. | 2-difluoromethyl-9α-fluoro-prednisolone. |
| 17,20; 20,21-bismethylene-dioxy-2-formyl-9α-chloro-$\Delta^{1,4}$-pregnadien-11β-ol-3-one. | 2-difluoromethyl-9α-chloro-prednisolone. |
| 17,20; 20,21-bismethylene-dioxy-2-formyl-$\Delta^1$-allopregnen-11β-ol-3-one. | 2-difluoromethyl-$\Delta^1$-allopregnene-11β,17α,21-triol-3,20-dione. |
| 17,20; 20,21-bismethylene-dioxy-2-formyl-$\Delta^1$-allopregnen-3-one. | 2-difluoromethyl-$\Delta^1$-allopregnene-17α,21-diol-3,20-dione. |
| 17,20; 20,21-bismethylene-dioxy-2-formyl-$\Delta^{1,4}$-pregnadien-3-one. | 2-difluoromethyl-$\Delta^{1,4}$-pregnadiene-17α,21-diol-3,20-dione. |
| 17,20; 20,21-bismethylene-dioxy-2-formyl-16α-methyl-$\Delta^{1,4}$-pregnadiene-3,11-dione. | 2-difluoromethyl-16α,methyl-prednisone. |
| 17,20; 20,21-bismethylene-dioxy-2-formyl-16β-methyl-$\Delta^{1,4}$-pregnadien-3,11-dione. | 2-difluoromethyl-16β-methyl prednisone. |
| 17,20; 20,21-bismethylene-dioxy-2-formyl-16α-methyl-$\Delta^{1,4}$-pregnadien-3-one. | 2-difluoromethyl-16α-methyl-$\Delta^{1,4}$-pregnadiene-17α,21-diol-3,20-dione. |

*Example VI*

2 g. of 9α-fluoro-dihydroallocortisone-21-acetate, obtained as described in J. Am. Chem. Soc. 77, 3166 (1955) was dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing 9α-fluoro-dihydroallocortisone.

The foregoing compound was converted successively into the bismethylenedioxy derivative, 17,20;20,21-bismethylenedioxy-2-hydroxymethylene-9α-fluoro - allopregnan-11β-ol-3-one and 17,20;20,21-bismethylenedioxy-2-formyl-9α-fluoro-$\Delta^1$-allopregnen-11β-ol-3-one by following the methods described in preparations III, IV and I.

A solution of 1.5 g. of 17,20;20,21-bismethylenedioxy-2-formyl-9α-fluoro-$\Delta^1$-allopregnen-11β-ol-3-one in 30 cc. of chloroform containing 2% of ethanol was treated with 7.5 cc. of sulfur tetrafluoride and the mixture kept in a sealed steel tube for 48 hours. After the hereinbefore described isolation technique there was obtained 17,20;-20,21 - bismethylenedioxy-2-difluoromethyl-9α-fluoro-$\Delta^1$-allopregnen-11β-ol-3-one.

The bismethylenedioxy group was then hydrolyzed with 60% formic acid, by following the method of Example IV, thus giving 2-difluoromethyl-9α-fluoro-$\Delta^1$- allopregnene-11β,17α,21-triol-3,20-dione.

A mixture of 1 g. of the above compound, 5 cc. of pyridine and 2 cc. of acetic anhydride was heated for 1 hour on the steam bath, poured into water and the precipitate formed was collected, thus yielding the 21-acetate of 2-difluoromethyl-9α-fluoro - $\Delta^1$ - allopregnene-11β,17α,21-triol-3,20-dione.

In a similar manner, starting from 16α-methyl-9α-fluoro-hydrocortisone 21-acetate there were obtained as final products 2 - difluoromethyl-9α-fluoro-16α-methyl-prednisolone and its acetate.

*Example VII*

By following the esterification method of the preceding example, 2-difluoromethyl-prednisolone, 2-difluoromethyl-16α-methyl-prednisone and 2 - difluoromethyl-9α-fluoro-prednisolone were converted into the corresponding 21-acetates.

*Example VIII*

By following the method described in Example IV, 17,20;20,21-bismethylenedioxy-2-formyl - 9α - fluoro-$\Delta^4$-pregnene-11β,16α-diol-3-one was converted successively into 17,20;20,21-bismethylenedioxy - 2 - difluoromethyl-9α-fluoro-$\Delta^{1,4}$-pregnadiene-11β,16α-diol-3-one and 2 - difluoromethyl-9α-fluoro-16α-hydroxy-prednisolone.

To a solution of 1 g. of the latter compound in 120 cc. of acetone there was aded 0.5 cc. of 72% perchloric acid. After 1 hour at room temperature 30 drops of pyridine were added and the resulting solution was evaporated to dryness under reduced pressure. 30 cc. of water were added to the residue and it was then extracted several times with 80 cc. of ethyl acetate. The combined extracts were washed to neutrality with water, dried over sodium sulfate and evaporated to dryness. The residue upon trituration with methanol gave a crude 16,17-acetonide. Recrystallizations from the same solvent furnished 2-difluoromethyl-9α-fluoro-16α,17α-isopropylidenedioxy-$\Delta^{1,4}$-pregnadiene-11β,21-diol-3,20-dione.

In a similar manner, starting from 17,20;20,21-bismethylenedioxy-2-formyl - $\Delta^{1,4}$ - pregnadien-16α-ol-3-one there were obtained 17,20;20,21-bismethylenedioxy-2-difluoromethyl - $\Delta^{1,4}$ - pregnadien-16α-ol-3-one, 2-difluoromethyl-$\Delta^{1,4}$-pregnadien-16α,17α,21-triol-3,20-dione and 2-difluoromethyl-16α,17α-isopropylidenedioxy - $\Delta^{1,4}$ - pregnadien-21-ol-3,20,-dione.

Example IX

A mixture of 1 g. of 2-difluoromethyl-9α-fluoro-16α-hydroxy-prednisolone, 4 cc. of pyridine and 4 cc. of acetic anhydride was kept at room temperature overnight, poured into ice water, the formed precipitate was filtered, washed with water and dried. Crystallization from acetone-hexane gave 2-difluoromethyl-9α-fluoro-16α-hydroxy-prednisolone-16,21-diacetate.

In a similar manner, but using propionic, caproic and cyclopentylpropionic anhydrides as esterifying agents there were produced the 16,21-dipropionate, dicaproate and dicyclopentylpropionate of 2-difluoromethyl-9α-fluoro-16α-hydroxy-prednisolone.

Example X 5 g. of 20-ethylenedioxy-allopregnan-3-one were condensed with ethyl formate in the presence of sodium hydride, followed by treatment with hydrochloric acid to produce 2-hydroxymethyl-allopregnane-3,20-dione.

Upon treatment of the latter compound with 2,3-dichloro-5,6-dicyano-1,4-benzoquinone in dioxane solution, by following the method of Preparation I, there was produced 2-formyl-$\Delta^1$-allopregnene-3,20-dione.

The foregoing compound was then reacted with sulfur tetrafluoride-hydrogen fluoride in carbon tetrachloride solution, in accordance with the method of Example II, thus yielding 2-difluoromethyl-$\Delta^1$-allopregnene-3,20-dione.

Example XI 5 g. of 16α-methyl-allopregnane-17α,21-diol-3,20-dione 21-acetate, described by E. Oliveto et al. in J. Am Chem. Soc. 80, 4431 (1958) were saponified with dilute potassium hydroxide solution, by following the method of Example VI and the resulting 16α-methyl-allopregnane-17α,21-diol-3,20-dione was converted successively into 17,20;20,21 - bismethylenedioxy-16α-methyl-allopregnane-3-one, 2-hydroxymethylene-17,20;20,21 - bismethylenedioxy-16α-methyl-allopregnan-3-one and 2-formyl-17,20;20,21-bismethylenedioxy-16α-methyl-$\Delta^1$-allopregnen-3-one.

By reaction of the latter compound with sulfur tetrafluoride in chloroform solution in accordance with the method of Example VI, there was produced 2-difluoromethyl - 16α - methyl-17,20;20,21-bismethylenedioxy-$\Delta^1$-allopregnen-3-one which upon treatment with 60% formic acid, following the method of Example IV, gave 2-difluoromethyl - 16α - methyl-$\Delta^1$-allopregnene-17α,21-diol-3,20-dione.

Esterification of the foregoing compound with acetic and with propionic anhydride in pyridine solution gave respectively the 21-acetate and 21-propionate of 2-difluoromethyl-16α-methyl-$\Delta^1$-allopregnene - 17α,21 - diol - 3,20-dione.

Example XII

To a mixture of 500 mg. of 2-difluoromethyl-$\Delta^1$-dehydro-17α-hydroxy-progesterone and 40 cc. of anhydrous benzene there were added 1 g. of p-toluene-sulfonic acid and 10 cc. of propionic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane gave 2 - difluoromethyl - $\Delta^1$ - dehydro-17α-propionoxy-progesterone.

When caproic and undecenoic anhydride were used as acylating agents there were obtained the caproate and undecenoate of 2-difluoromethyl-$\Delta^1$-dehydro-17α-hydroxy-progesterone.

Example XIII

By following the method described in Example II, 2-formyl-17α-methyl-$\Delta^1$-androsten-17β-ol-3-one, 2 - formyl-17α-ethinyl - $\Delta^1$ - androsten-17β-ol-3-one, 2-formyl-17α-methyl-$\Delta^{1,4}$-androstadien-17β-ol-3-one and 2-formyl-17α-vinyl-$\Delta^{1,4}$-androstadien-17β-ol-3-one were converted respectively into 2-difluoromethyl-17α-methyl-$\Delta^1$-androsten-17β-ol-3-one, 2 - difluoromethyl-17α-ethinyl-$\Delta^1$-androsten-17β-ol-3-one, 2 - difluoromethyl-17α-methyl-$\Delta^{1,4}$-androstadien-17β-ol-3-one and 2-difluoromethyl - 17α - vinyl-$\Delta^{1,4}$-androstadien-17β-ol-3-one.

Upon esterification of these difluoromethyl compounds with acetic anhydride in benzene solution and in the presence of p-toluenesulfonic acid, in accordance with the method of Example XII, there were obtained the corresponding esters.

Example XIV

By following the method of Example 5, 2 g. of 2-formyl-$\Delta^1$-allopregnene-17α-ol-3,20-dione were converted into 2 - difluoromethyl-$\Delta^1$-allopregnene-17α-ol-3,20-dione. Esterification of the latter compound with acetic anhydride in accordance with the method of Example II, gave 2 - difluoromethyl-$\Delta^1$-allopregnene-17α-ol-3,20-dione acetate.

The starting material, 2-formyl-$\Delta^1$-allopregnen-17α-ol-3,20-dione is obtained from allopregnan-3β,17α-diol-20-one, by ketalization at C–20, oxidation at C–3 with chromium trioxide in pyridine, condensation of the resulting 3-keto compound with ethyl formate in the presence of sodium hydride followed by treatment with acid to produce 2-hydroxymethylene-allopregnan-17α-ol-3,20-dione and finally reaction of this last mentioned compound with 2,3-dichloro - 5,6 - dicyano-1,4-benzoquinone as described in Preparation I.

Example XV

By following the methods described in Preparations III, IV and I, 5 g. of 16α-hydroxy-hydrocortisone were converted successively into 17,20;20,21-bismethylenedioxy-$\Delta^4$-pregnene - 11β,16α-diol-3-one, 2-hydroxymethylene-17,20;20,21 - bismethylenedioxy-$\Delta^4$-pregnene-11β,16α-diol-3-one and 2-formyl-17,20;20,21-bismethylenedioxy-$\Delta^{1,4}$-pregnadiene-11β,16α-diol-3-one.

A solution of 2 g. of the last mentioned compound in 50 cc. of chloroform containing 2% of ethanol was treated with sulfur tetrafluoride in accordance with the method of Example VI.

Upon hydrolysis of the bismethylenedioxy group, there was obtained 2-difluoromethyl-$\Delta^{1,4}$-pregnadiene-11β,16α,17α,21-tetrol-3,20-dione.

Example XVI

A solution of 5 g. of 17,20;20,21-bismethylene-dioxy-$\Delta^4$-pregnene-11β,16α-diol-3-one, intermediate in the previous example in 200 cc. of ethyl acetate was shaken with 500 mg. of previously reduced 5% palladium on charcoal catalyst in a hydrogen atmosphere until the gas uptake corresponded to one mol. The catalyst was filtered through celite and the filtrate evaporated to dryness. Recrystallization of the residue from acetone-hexane afforded 17,20;20,21 - bismethylenedioxy-allopregnane-11β,16α-diol-3-one.

The latter compound was then converted successively into 2-hydroxymethylene-17,20;20,21-bismethylenedioxy-allopregnane-11β,16α-diol-3-one and 2-formyl-17,20;20,-21-bismethylenedioxy-$\Delta^1$-allopregnene-11β,16α-diol-3-one by following the methods of Preparations IV and I respectively.

By following the method described in Example IV, 2 g. of the 2-formyl-$\Delta^1$ compound were converted into 17,20;-20,21-bismethylenedioxy-2-difluoromethyl - $\Delta^1$ - allopregnene-11β,16α-diol-3-one and 2-difluoromethyl-$\Delta^1$-allopregnene-11β,16α,17α,21-tetrol-3,20-dione.

Example XVII

A mixture of 1 g. of 2-difluoromethyl-$\Delta^1$-allopregnene 11β,16α,17α,21-tetrol-3,20-dione, 50 cc. of freshly distilled acetophenone and 0.5 cc. of 72% perchloric acid was stirred at room temperature for 1 hour. The resulting mixture was washed with sodium bicarbonate solution and with water to neutrality, then it was steam distilled and the product extracted with methylene chloride. The extract was dried over anhydrous sodium sulfate and evaporated to dryness. Crystallization from acetone-hexane yielded the 16,17-acetophenonide of 2-difluoromethyl-Δ¹-allopregnene-11β,16α,17α,21-tetrol-3,20-dione.

Esterification of the foregoing compound with acetic anhydride in pyridine solution, by following the method of Example VI, afforded the 21-monoacetate.

We claim:
1. A compound of the following formula:

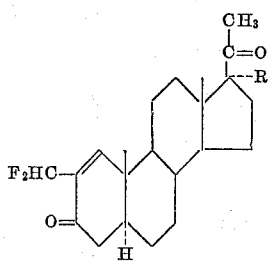

wherein R is selected from the group consisting of hydrogen, hydroxy and an hydrocarbon carboxylic acyloxy group of less than 12 carbon atoms.

2. 2-difluoromethyl-Δ¹-allopregnene-3,20-dione.
3. 2-difluoromethyl-Δ¹-allopregnen-17α-ol-3,20-dione.
4. The acetate of 2-difluoromethyl-Δ¹-allopregnen-17α-ol-3,20-dione.
5. A compound of the following formula:

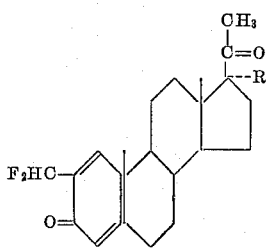

wherein R is selected from the group consisting of hydrogen, hydroxy and an hydrocarbon carboxylic acyloxy group of less than 12 carbon atoms.

6. 2-difluoromethyl-Δ¹,⁴-pregnadiene-3,20-dione.
7. 2-difluoromethyl-Δ¹,⁴-pregnadien-17α-ol-3,20-dione.
8. The acetate of 2-difluoromethyl-Δ¹,⁴-pregnadien-17α-ol-3,20-dione.
9. A compound of the following formula:

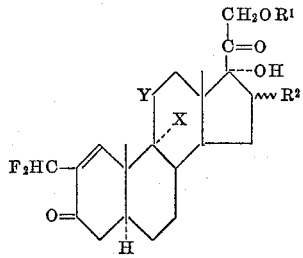

wherein $R^1$ is selected from the group consisting of hydrogen and an hydrocarbon carboxylic acyl group of less than 12 carbon atoms; $R^2$ is selected from the group consisting of hydrogen, α-methyl, β-methyl, α-hydroxy and α-hydrocarbon carboxylic acyloxy group of less than 12 carbon atoms; Y is selected from the group consisting of hydrogen, β-hydroxy and keto and X is selected from the group consisting of hydrogen, chlorine and fluorine.

10. 2 - difluoromethyl-Δ¹-allopregnene-17α,21-diol-3,20-dione.
11. 2 - difluoromethyl - Δ¹ - allopregnene - 11β,17α,21-triol-3,20-dione.
12. 2 - difluoromethyl - 9α - fluoro-Δ¹-allopregnene-11β,17α,21-triol-3,20-dione.
13. 2-difluoromethyl - 16α - methyl - Δ¹ - allopregnene-17α,21-diol-3,20-dione.
14. A compound of the following formula:

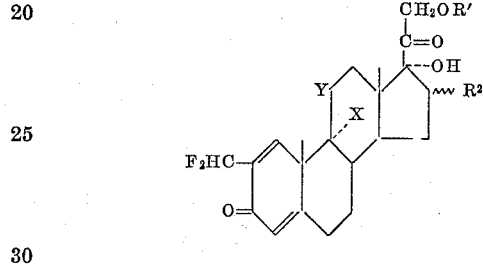

wherein $R^1$ is selected from the group consisting of hydrogen and an hydrocarbon carboxylic acyl group of less than 12 carbon atoms; $R^2$ is selected from the group consisting of hydrogen, α-methyl, β-methyl, α-hydroxy and α-hydrocarbon carboxylic acyloxy group of less than 12 carbon atoms; Y is selected from the group consisting of hydrogen, β-hydroxy and keto and X is selected from the group consisting of hydrogen, chlorine and fluorine.

15. 2-difluoromethyl-Δ¹,⁴-pregnadiene-17α,21-diol-3,20-dione.
16. 2 - difluoromethyl-16α-methyl-Δ¹,⁴-pregnadiene-17α,21-diol,3,20-dione.
17. 2-difluoromethyl-Δ¹,⁴-pregnadiene-16α,17α,21-triol-3,20-dione.
18. 2-difluoromethyl-prednisone.
19. 2-difluoromethyl-9α-fluoro-prednisolone.
20. 2-difluoromethyl-16-methyl-prednisone.
21. 2-difluoromethyl-9α-fluoro-16α,17α-isopropylidenedioxy-Δ¹,⁴-pregnadiene-11β,21-diol-3,20-dione.
22. 2 - difluoromethyl-9α-fluoro-16α-hydroxy-prednisolone-16,21-diacetate.
23. A process for producing 2-difluoromethyl-Δ¹-3-ketosteroids selected from the group consisting of the androstane and pregnane series which comprises treatment of a corresponding 2-formyl-Δ¹-3-keto compound with a mixture of sulfur tetrafluoride-hydrogen fluoride in the presence of a chlorinated hydrocarbon solvent.
24. The process of claim 23 in which both the starting materials and the final compound possess an additional double bond at C-4,5.

No references cited.